United States Patent Office 2,828,258
Patented Mar. 25, 1958

2,828,258

AQUEOUS DRILLING FLUID

William E. Thompson, Wallingford, Pa., assignor to Sun Oil Company, Philadelphia, Pa., a corporation of New Jersey No Drawing. Application November 28, 1955
Serial No. 549,548

12 Claims. (Cl. 252—8.5)

This invention relates to the drilling of oil or gas wells and more particularly relates to improved aqueous drilling fluids of a type containing alkaline earth metal components and which are resistant to thickening under high temperature well conditions.

In drilling oil or gas wells by the rotary method it is known to use drilling fluids which comprise an aqueous dispersion of a hydratable clay that has been converted to the calcium form by treatment with lime and which contains a dispersant for the clay particles. Dispersants which are suitable for this purpose are the lignosulfonates, such as described in Barnes Patent No. 2,491,436, and tannin extracts of which the most commonly used is quebracho. In order for these materials to function properly in the drilling mud, it is necessary that caustic soda be added in addition to the lime. Generally the amounts of these components incorporated in the mud composition are within the ranges of 1–15 lbs./bbl. of lime, 1–10 lbs./bbl. of the dispersant and 0.2–4 lbs./bbl. of caustic soda.

The foregoing calcium base type of drilling mud has certain advantages over the more common sodium base type, particularly in being more resistant to contamination by calcareous contaminants such as limestone, anhydrite, gypsum and cement. When drilling through calcium-containing materials such as these with a sodium base mud, the presence of calcium ions causes the clay to be converted by ion exchange predominantly to the calcium form, as a result of which the viscosity and gelation characteristics of the mud may increase to such extent as to cause difficulties in further drilling. It is customary practice to treat the mud in such case with a viscosity controlling agent, such as various phosphate compounds, quebracho, lignin, tannin and the like, which acts as a dispersant for the clay particles. This treatment, however, is not always effective for controlling or regulating the viscosity and gelation characteristics of the mud to the desired levels. Accordingly, it often is best to convert the mud purposely to the calcium form in the manner described above, so that its viscosity and gelation properties will remain more stable in the presence of contaminating calcareous materials.

While the calcium base muds offer various advantages over ordinary drilling muds, it has been found that they have a tendency to undergo gelation and increase in viscosity when subjected to high temperature well conditions. This thickening effect generally does not occur at temperatures below 200° F. If the limed mud is subjected to higher temperatures, however, an inordinate increase in viscosity may occur. Such thickening of the drilling mud may take place during the course of drilling deep wells wherein temperatures up to 350° F. or higher may be encountered. In some instances where the drilling operation has been stopped and the mud has been allowed to stand quiescent in the borehole for a time, it has been found that gelation of the mud occurs to such extent that it becomes no longer pumpable and may even solidify. Perkins Patent No. 2,491,437 describes this problem and proposes one method of alleviating it.

The present invention is directed to an improved drilling fluid composition which is resistant to thickening under well conditions. It has now been found that by incorporating magnesium hydroxide in the mud along with another alkaline earth metal hydroxide, which can be either calcium or barium hydroxide or both, a composition is obtained which is relatively stable against contamination by calcareous materials and which also will not thicken inordinately at high temperatures.

According to the present invention the improved drilling fluid comprises a hydratable clay, an alkali metal hydroxide such as caustic soda, a clay dispersant which can be either a lignosulfonate or a tannin extract such as quebracho, magnesium hydroxide and another alkaline earth metal hydroxide which can be either calcium hydroxide or barium hydroxide. While the amounts of the various components that should be used in preparing the mud composition will vary depending upon such factors as the type and amount of clay present in the mixture, the type and amount of contaminants that will be encountered, the temperature to which the composition is apt to be subjected, etc., the following are generally useful ranges for practicing the invention:

| | Lbs./bbl. |
|---|---|
| Caustic soda | 0.2–4 |
| Dispersant | 1–10 |
| Mg(OH)$_2$ | 1–15 |
| Ca(OH)$_2$ or Ba(OH)$_2$ | 1–15 |

Also, as a general rule, the weight proportion of the other alkaline earth metal (Ca or Ba) hydroxide to the magnesium hydroxide will be within the range of 3:1 to 2:3, although other proportions are not excluded for practicing the invention. If desired, both calcium and barium hydroxide may be used in the mud composition in addition to the magnesium hydroxide.

One typical example of a drilling fluid made according to the invention comprises an aqueous suspension containing 6% bentonite by weight and having incorporated therein 1 lb./bbl. of NaOH, 3 lbs./bbl. of either sodium or calcium lignosulfonate, 2 lbs./bbl. of magnesium hydroxide and 4 lbs./bbl. of lime. In place of the bentonite suspension a 30% illite suspension can be employed, with the other ingredients being added in the same amounts as stated above. Another typical example comprises a 6% bentonite suspension (or 30% illite suspension) to which is added 1 lb./bbl. of caustic soda, 3 lbs./bbl. of quebracho, 4 lbs./bbl. of magnesium hydroxide and 10 lbs./bbl. of lime.

The heat stability of mud compositions prepared according to this invention results from the presence of magnesium hydroxide in the mixture. The reason why this component inhibits thickening of the mud under high temperature well conditions is not known with certainty, but it is thought to be attributable to an interference effect caused by the magnesium hydroxide. It is believed that the heat thickening of a lime base mud is due to some reaction between the calcium hydroxide and the clay that occurs at high temperature and tends to cause the mixture to gel or solidify. This same type of reaction appears to occur if barium hydroxide is used in place of lime. On the other hand, magnesium hydroxide acts differently from either calcium or barium hydroxide. It is believed that the magnesium hydroxide becomes incorporated into the clay particles in a different manner from the other alkaline earth metal hydroxides and that it then interferes with the type of reaction which calcium and barium hydroxides otherwise would undergo with the clay. In any event the presence of the magnesium hydroxide imparts heat stability characteristics which the mixture would not have in the absence of this component.

The present type of drilling fluid may be prepared utilizing any order of addition of the several components to the clay-water suspension. It is distinctly preferable, however, to add the magnesium hydroxide prior to adding the other alkaline earth metal hydroxide and to allow a time of aging of at least six hours and preferably longer before adding the other hydroxide. This procedure aids in producing a more heat stable composition, probably because it permits the magnesium hydroxide to become incorporated in the clay particles before the calcium or barium hydroxide has had a chance to react with the clay, thus effectively interfering with the latter reaction.

In practicing the present invention in a well drilling operation the drilling usually will be carried out in the earlier stages by employing a conventional sodium base drilling mud such as a sodium bentonite dispersion. As the drilling proceeds, it may become advisable to convert the mud to the alkaline earth metal-containing form to stabilize it against contamination by calcareous materials. This should be anticipated sufficiently in advance of the time that such contamination is likely to occur so that the desired treatment prior to the addition of lime can be effected. This is done by adding caustic soda and quebracho or a lignosulfonate dispersant to the mud and then incorporating magnesium hydroxide in the mixture. Drilling should then be continued for at least six hours and preferably for one or two days before the other hydroxide is added. This will provide an aging time during which the magnesium hydroxide can become incorporated in the clay particles to impart heat stability characteristics. Thereafter and before serious contamination of the mud has occurred, lime or barium hydroxide can be added to complete the conversion. The mud will then be suitable for drilling through cement or calcium-containing formations and to depths at which high temperatures are encountered. It may be desirable from time to time during prolonged drilling to add additional amounts of caustic soda, dispersant, magnesium hydroxide and lime in order to maintain the desired viscosity and gelatin characteristics.

The following examples provide specific illustrations of the invention:

*Example I*

A 30% aqueous suspension of an illite clay was used as the base drilling mud composition. This was treated with caustic soda in amount of 1 lb./bbl. and with quebracho in amount of 3 lbs./bbl. To one portion of the mixture there was added 10 lbs./bbl. of lime; to another portion the same amount of lime was added along with 4 lbs./bbl. of magnesium hydroxide. Each of the resulting compositions was heated to 350° F. and maintained at this temperature for 72 hours. Stormer viscosities before and after heating were as follows:

|  | Before Heating, cp. | After Heating, cp. |
|---|---|---|
| No magnesium hydroxide | 11 | 46 |
| With magnesium hydroxide | 13 | 23 |

The results show that while the viscosities were nearly the same initially, after heat treatment the mud which contained only the lime had a viscosity twice that of the other mud.

*Example II*

A 30% suspension of another illite clay to which was added caustic soda and quebracho in amounts of 1 and 3 lbs./bbl., respectively, was treated in two portions. To one portion was added 8 lbs./bbl. of lime alone, while to the other lime and magnesium hydroxide were added in amounts of 4 lbs./bbl. each. Thus each portion contained the same total weight of alkaline earth metal hydroxide. Heat treatment at 350° F. for 72 hours resulted in the following viscosity changes:

|  | Before Heating, cp. | After Heating, cp. |
|---|---|---|
| No magnesium hydroxide | 12 | 52 |
| With magnesium hydroxide | 4 | 8 |

These results show that the mud made with lime alone was subject to considerably greater increase in viscosity upon heating than the one which also contained magnesium hydroxide.

*Example III*

In this example a lignosulfonate dispersant was used instead of quebracho. The base mud was a 30% suspension of illite to which was added 1 lb./bbl. of caustic soda and 3 lbs./bbl. of calcium lignosulfonate known commercially as "Kembreak." One portion of the base mud was treated with 4 lbs./bbl. of lime alone while the other was treated with both lime and magnesium hydroxide in amounts of 4 lbs./bbl. each. The samples were heated as in the preceding examples, with the following results:

|  | Before Heating, cp. | After Heating, cp. |
|---|---|---|
| No magnesium hydroxide | 4 | 90 |
| With magnesium hydroxide | 3 | 20 |

*Example IV*

This example illustrates the preferred manner of making the drilling fluid by providing an aging period between the additions of the two alkaline earth metal hydroxides. A 30% illite dispersion to which was added 1 lb./bbl. of caustic soda and 3 lbs./bbl. of calcium lignosulfonate was used as the base mud. One portion was treated with 4 lbs./bbl. of lime. The other portion was treated with 3 lbs./bbl. of magnesium hydroxide and allowed to age at room temperature for two days. Thereafter lime in amount of 4 lbs./bbl. was added. Each sample was heat treated as in previous examples.

|  | Before Heating, cp. | After Heating, cp. |
|---|---|---|
| No magnesium hydroxide | 9 | Solid |
| With magnesium hydroxide | 11 | 30 |

These results show that the preferred treatment, involving addition of magnesium hydroxide followed by aging prior to the addition of lime, was very effective in avoiding thickening during heating. The sample treated with lime alone became a solid mass during the heat treatment, whereas the one prepared according to the invention remained fluid and did not exhibit an excessive viscosity increase.

I claim:

1. An aqueous drilling fluid having improved resistance to thickening under high temperature well conditions which comprises a hydratable clay, an alkali metal hydroxide and a clay dispersant selected from the group consisting of tannin extracts and lignosulfonates, said drilling fluid having incorporated therein magnesium hydroxide and another alkaline earth metal hydroxide selected from the group consisting of calcium hydroxide and barium hydroxide, said hydroxides each being incorporated in the mixture in amount of at least 1 lb./bbl. and in a weight ratio of said other hydroxide to magnesium hydroxide within the range of 3:1 to 2:3.

2. A drilling fluid according to claim 1 in which said other hydroxide is calcium hydroxide.

3. A drilling fluid according to claim 2 in which the amounts of calcium hydroxide and magnesium hydroxide are each within the range of 1–15 lbs./bbl.

4. An aqueous drilling fluid having improved resistance to thickening under high temperature well conditions which comprises a hydratable clay, an alkali metal hydroxide and quebracho in amount of 1–10 lbs./bbl., said drilling fluid having incorporated therein 1–15 lbs./bbl. of calcium hydroxide and 1–15 lbs./bbl. of magnesium hydroxide, the weight ratio of calcium hydroxide to magnesium hydroxide being in the range of 3:1 to 2:3.

5. An aqueous drilling fluid having improved resistance to thickening under high temperature well conditions which comprises a hydratable clay, an alkali metal hydroxide and calcium lignosulfonate in amount of 1–10 lbs./bbl., said drilling fluid having incorporated therein 1–15 lbs./bbl. of calcium hydroxide and 1–15 lbs./bbl. of magnesium hydroxide, the weight ratio of calcium hydroxide to magnesium hydroxide being in the range of 3:1 to 2:3.

6. Method of preparing and utilizing in a well drilling operation a drilling fluid resistant to thickening under high temperature well conditions which comprises forming a dispersion of a hydratable clay in water and incorporating in the dispersion an alkali metal hydroxide, a clay dispersant selected from the group consisting of tannin extracts and lignosulfonates, magnesium hydroxide and another alkaline earth metal hydroxide selected from the group consisting of calcium hydroxide and barium hydroxide, said hydroxides each being incorporated in the mixture in amount of at least 1 lb./bbl. and in a weight ratio of said other hydroxide to magnesium hydroxide within the range of 3:1 to 2:3, and circulating the mixture through the borehole and in contact with the borehole wall during the drilling operation.

7. Method according to claim 6 wherein said other hydroxide is calcium hydroxide.

8. Method according to claim 7 wherein the amounts of calcium hydroxide and magnesium hydroxide are each within the range of 1–15 lbs./bbl.

9. Method of preparing a drilling fluid resistant to thickening under high temperature well conditions which comprises forming a dispersion of a hydratable clay in water, an alkali metal hydroxide and a clay dispersant selected from the group consisting of tannin extracts and lignosulfonates, adding magnesium hydroxide in amount of at least 1 lb./bbl. to said dispersion, and then after at least six hours following the addition of the magnesium hydroxide adding to the dispersion another alkaline earth metal hydroxide selected from the group consisting of calcium hydroxide and barium hydroxide in amount of at least 1 lb./bbl. and in a weight proportion to the magnesium hydroxide within the range of 3:1 to 2:3.

10. Method according to claim 9 wherein said other hydroxide is calcium hydroxide.

11. In the rotary drilling of a well wherein a drilling fluid comprising an aqueous dispersion of a hydratable clay, an alkali metal hydroxide and a clay dispersant selected from the group consisting of tannin extracts and lignosulfonates is circulated through the borehole and wherein calcareous contaminants are apt to be encountered, the steps of converting the drilling fluid to a form resistant to thickening due to such contamination and also due to high temperature well conditions which comprise adding 1–15 lbs./bbl. of magnesium hydroxide to the drilling fluid in advance of encountering such contaminants, continuing the drilling operation with the resulting composition for a time of at least six hours, and then prior to substantial contamination adding to the composition 1–15 lbs./bbl. of another alkaline earth metal hydroxide selected from the group consisting of calcium hydroxide and barium hydroxide, the weight proportion of said other hydroxide to the magnesium hydroxide added being within the range of 3:1 to 2:3.

12. Method according to claim 11 wherein said other hydroxide is calcium hydroxide.

References Cited in the file of this patent

UNITED STATES PATENTS

| | | |
|---|---|---|
| 2,491,436 | Barnes | Dec. 13, 1949 |
| 2,692,856 | Litman | Oct. 26, 1954 |
| 2,789,949 | Scotty | Apr. 23, 1957 |